United States Patent
Harada

(10) Patent No.: US 9,951,867 B2
(45) Date of Patent: Apr. 24, 2018

(54) PISTON DAMPER

(75) Inventor: Akinori Harada, Fujisawa (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 397 days.

(21) Appl. No.: 13/881,598

(22) PCT Filed: Oct. 26, 2011

(86) PCT No.: PCT/JP2011/074656
§ 371 (c)(1),
(2), (4) Date: May 10, 2013

(87) PCT Pub. No.: WO2012/057193
PCT Pub. Date: May 3, 2012

(65) Prior Publication Data
US 2014/0150644 A1    Jun. 5, 2014

(30) Foreign Application Priority Data

Oct. 26, 2010   (JP) .................................. 2010-239187

(51) Int. Cl.
*F16F 9/54*    (2006.01)
*F16J 1/00*    (2006.01)
(Continued)

(52) U.S. Cl.
CPC .............. *F16J 1/005* (2013.01); *F16C 11/04* (2013.01); *F16C 25/04* (2013.01); *F16F 9/0218* (2013.01);
(Continued)

(58) Field of Classification Search
CPC ..... F16F 9/54; F16F 9/516; F16F 9/02; Y10T 403/7061
See application file for complete search history.

(56) References Cited

U.S. PATENT DOCUMENTS 3,415,153 A * 12/1968 Steiner .......................... 411/512
3,438,660 A *  4/1969 Steiner .................... F01L 1/047
                                                                    403/357
(Continued)

FOREIGN PATENT DOCUMENTS

DE       19744796 A1    5/1999
GB        2112450 A    7/1983
(Continued)

OTHER PUBLICATIONS

Japan Patent Office, "Office Action for JP 2010-239187," dated Mar. 4, 2014.
(Continued)

*Primary Examiner* — F. Daniel Lopez
(74) *Attorney, Agent, or Firm* — Manabu Kanesaka

(57) ABSTRACT

A piston damper has a cylinder including an attachment portion; a piston reciprocatingly disposed inside the cylinder; and a rod including an attachment portion that is moved synchronously with the piston. Each of the attachment portions of the cylinder and the rod is adapted to connect to different one of a first member and a second member to damp a movement of the other member relative to one member among both the members. At least one of the attachment portion of the cylinder and the attachment portion of the rod is formed with a fitting hole, and the attachment portion is axially supported in a fitted state between the fitting hole and an axis relative to at least one of the first member and the second member, and includes an urging device absorbing looseness of the fitting hole relative to the axis.

3 Claims, 17 Drawing Sheets

(51) Int. Cl.
*F16F 9/02* (2006.01)
*F16F 9/32* (2006.01)
*F16C 11/04* (2006.01)
*F16C 25/04* (2006.01)

(52) U.S. Cl.
CPC .......... *F16F 9/3221* (2013.01); *F16F 9/3235* (2013.01); *F16F 9/54* (2013.01); *F16C 2361/53* (2013.01)

(56) References Cited

U.S. PATENT DOCUMENTS

| | | | |
|---|---|---|---|
| 4,779,845 A | 10/1988 | Bartesch et al. | |
| 4,856,625 A * | 8/1989 | Oshida | 188/282.1 |
| 5,657,969 A | 8/1997 | Bivens | |
| 5,984,061 A * | 11/1999 | Lack et al. | 188/322.19 |
| 6,098,966 A * | 8/2000 | Latvis, Jr. | F16F 9/54 267/221 |
| 6,199,673 B1 * | 3/2001 | Wach | 188/322.18 |
| 6,460,839 B2 * | 10/2002 | Muller | 267/221 |
| 6,470,553 B1 * | 10/2002 | Retzbach | 29/450 |
| 6,578,832 B2 * | 6/2003 | Katoh | F16F 9/0218 16/66 |
| 2009/0084645 A1 * | 4/2009 | Okabayashi | F16F 9/0218 188/266.6 |
| 2010/0162522 A1 | 7/2010 | Han et al. | |

FOREIGN PATENT DOCUMENTS

| | | |
|---|---|---|
| JP | S47-029752 A | 7/1972 |
| JP | S57-204922 U | 12/1982 |
| JP | S58-196439 U | 12/1983 |
| JP | H01-174620 U | 12/1989 |
| JP | H02-129424 A | 5/1990 |
| JP | H06-000961 U | 1/1994 |
| JP | 2000-274479 A | 10/2000 |

OTHER PUBLICATIONS

Japan Patent Office, "Office Action for JP 2010-239187," dated Jan. 10, 2014.
Europe Patent Office, "Search Report for EP 11836326.6," dated Jul. 23, 2014.

* cited by examiner

US 9,951,867 B2

PISTON DAMPER

RELATED APPLICATIONS

The present application is based on Japanese Patent Application No. 2010-239187 filed on Oct. 26, 2010, and all contents thereof are incorporated herein as a reference.

FIELD OF TECHNOLOGY

The present invention relates to a piston damper suitable for dampening a movement speed of a second member relative to a first member.

BACKGROUND ART

Although the piston damper is the same as a rotary damper, for example, in terms of applying a brake on the movement speed of the second member relative to the first member, the piston damper can easily be assembled without the need for a gear and the like compared to the rotary damper. As one example thereof, FIGS. 11(a) and 11(b) show a structure of a piston damper (an air damper) disclosed in Patent Document 1. FIG. 11(a) shows a usage example of the piston damper (air damper), and FIG. 11(b) shows the structure of the piston damper. The piston damper D comprises a cylinder 11, a piston 31 reciprocally disposed inside the cylinder 11, and a rod 41 moved synchronously with the piston 31. Also, on an external surface of the cylinder 11, there is provided an attachment portion (an attachment piece) 18 wherein a fitting hole (an attachment hole) 19 is formed. Also, in an end portion of the rod 41, there is provided a clamp-type attachment portion (a locking portion) 42 wherein one portion of a hole is open. Then, in the piston damper D, the cylinder 11 is axially supported on a disposed portion on an instrument panel side by an axis of a screw, a bolt, and the like, which are not shown in the figures, using the fitting hole 19. The rod 41 is axially supported on a disposed portion on a glove box G side by an axis of an axis-like projection, the bolt, and the like, which are not shown in the figures, using the attachment portion 42. Thereby, when a glove box G is switched from a state locked by a lock device at a closed position to an open position under its own weight by being unlocked by a press operation of an operation button B, the glove box G slowly turns while being dampened by the piston damper D.

In the aforementioned piston damper D, however, there is formed a housing groove 32 around the piston 31, and an O-ring 51 is housed in the housing groove 32. Also, there is provided an orifice (a first orifice) 35 using the housing groove 32. There is a possibility that the O-ring 51 can be twisted when the piston 31 moves in an axial direction inside the cylinder 11. When the O-ring 51 is twisted in such a manner, an external diameter of the O-ring 51 becomes smaller than an external diameter before the O-ring 51 is twisted so as to impair a braking action of the piston damper D. Therefore, in the piston damper D shown in FIG. 11(a) and FIG. 11(b), there is provided a fixed portion (a first encircling wall 33, and a projecting wall portion which is not shown in the figures) for a movement control corresponding to the O-ring 51 in a portion separated from the first orifice 35 in the piston 31 so as to prevent the O-ring 51 from twisting. Thereby, the braking action of the piston damper D can be obtained over a long period of time.

PRIOR ART DOCUMENT

Patent Document

Patent Document 1: Japanese Patent Application Publication No. 2005-240824

SUMMARY OF THE INVENTION

Problems to be Solved by the Invention

In the aforementioned conventional piston damper, the cylinder and the rod are often configured by the simple fitting hole as a structure of the attachment portion to the other side, and the cylinder and the rod are axially supported easily relative to a member on the other side by the axis of an all-purpose screw, the bolt, and the like. However, in a conventional attachment structure, even if the cylinder and the rod are axially supported, i.e., pivotally supported, or fixed relative to the member on the other side through the fitting between the axis and the fitting hole, due to a long-term usage, a temperature effect, and the like, there occurs looseness in the fitting hole relative to the axis so as to generate wobbling, or to become incapable of obtaining a braking force as designed.

The present invention is made in view of the aforementioned background. An object of the present invention is to improve the quality and reliability of the piston damper by simply and reliably preventing the looseness in the fitting hole relative to the axis, which can easily occur due to the long-term usage, a temperature change, and the like, and preventing the wobbling caused by the looseness while employing the simple fitting hole as the structure of the attachment portion of the cylinder and/or the rod configuring the piston damper.

Means for Solving the Problems

In order to obtain the aforementioned object, the present invention provides a piston damper having any of the following characteristics (1) to (6).

(1) The piston damper comprises a cylinder including an attachment portion; a piston reciprocatingly disposed inside the cylinder; and a rod including an attachment portion moved synchronously with the piston. Each of the attachment portions of the cylinder and the rod is connected differently to one of a first member or a second member to damp a movement of the other member relative to one member among both the members. A fitting hole is formed in at least one of the attachment portion of the cylinder and the attachment portion of the rod, and the attachment portion is axially supported in a fitting state between the aforementioned fitting hole and an axis relative to at least one of the first member and the second member, and includes an urging device absorbing looseness of the fitting hole relative to the aforementioned axis.

In the present invention, the "fitting hole" may have a hole shape corresponding to the axis, and may be any of a clamp type wherein one portion of a hole is open illustrated as an example in the attachment portion of the rod of the first embodiment; and a hold type of a ring or a through-hole shape illustrated as an example in the attachment portion of the cylinder of each embodiment and the rod of the second embodiment. The "axis" is inserted and passed through the fitting hole, and allows the cylinder or the rod to be axially supported. The "axis" includes an axis-like projection or a configuration similar to that, and a configuration using a screw or a bolt, or one similar to that. The "first member and second member" are, for example, a main body such as a device, an equipment, or the like, and various movable bodies having a relationship that is moved or turned relative to the main body.

Additionally, the above-mentioned piston damper preferably includes any of the following characteristics (2) to (6).

(2) The urging device comprises an elastic piece portion wherein one portion dividing an inner circumferential face of the fitting hole is deformably formed in a hole diameter direction.

(3) The elastic piece portion is deformed according to an arc-like slit having a shape substantially similar to one portion of the inner circumferential face of the fitting hole.

(4) The cylinder includes a cap placed in one end opening, and having a through-hole inserting and passing the rod. Also, the rod includes a fitting piece which elastically presses against an inner face of the through-hole immediately before the rod is pushed into the cylinder to the fullest extent.

(5) The cylinder and the rod each includes different one of a concave portion and a convex portion which can be mutually fitted when the rod is pushed into the cylinder.

(6) The cap includes a frame portion provided to protrude on an outer end face and edging the through-hole. Also, in a central part wherein the frame portion faces, there is formed a curve-shaped concave portion.

Effect of the Invention

The piston damper of the present invention includes the aforementioned characteristic (1). Accordingly, the piston damper of the present invention is the same as a conventional piston damper in that at least one of the attachment portion on a cylinder side and the attachment portion on a rod side is axially supported in the first member or the second member, which are members on the other side wherein the cylinder and the rod are attached. However, by the urging device, the looseness of the fitting hole relative to the axis is absorbed so as to become difficult to be affected by a long-term usage or a temperature change. Thereby, compared to a conventional structure, wobbling in the attachment portion is eliminated so as to be capable of maintaining an excellent braking action.

Also, the piston damper of the present invention additionally includes the aforementioned characteristic (2). Accordingly, the urging device comprises the elastic piece portion wherein one portion dividing the inner circumferential face of the fitting hole is deformably formed in the hole diameter direction, so that there is no need to newly add a member. Moreover, a design change from a conventional product can be kept to a minimum.

Also, the piston damper of the present invention additionally includes the aforementioned characteristic (3). Accordingly, the elastic piece portion is deformed according to the arc-like slit having the shape substantially similar to one portion of the inner circumferential face of the fitting hole so as to be capable of efficiently absorbing the looseness of the fitting hole relative to the axis.

Also, the piston damper of the present invention additionally includes the aforementioned characteristic (4). Accordingly, just before the rod is completely pushed in relative to the cylinder (for example, the movable bodies composed of the first member and the second member, wherein one is openable and closable relative to the other, become a closed state), the fitting piece on the rod side presses against the inner face of the through-hole on a cap side so as to diminish the wobbling between the members occurring between the cylinder (the cap) and the rod, and ease a load of each portion received from the rod. Also, an excessive push of the rod relative to the cylinder can be prevented.

Also, the piston damper of the present invention additionally includes the aforementioned characteristic (5). Accordingly, by the fitting of the concave portion and the convex portion, at a time of embedding the rod, the cylinder and the rod can prevent a wrong assembly such as a direction of the rod, and the like. Also, the wobbling between the members occurring between the cylinder (the cap) and the rod can be easily controlled.

Also, the piston damper of the present invention additionally includes the aforementioned characteristic (6). Accordingly, the rod is guided by the through-hole and the frame portion, so that a reciprocating movement of the rod is carried out in a more stable state. In addition, the piston damper of the present invention prevents an amount of expansion and contraction of the rod from being impaired by allowing the fitting piece to escape at the curve-shaped concave portion. Also, originality in a state wherein the rod is entered to its fullest extent can be obtained as well.

BEST MODES OF CARRYING OUT THE INVENTION

Hereinafter, an embodiment of the present invention will be explained with reference to drawings. In the explanation, the first embodiment shown in FIG. 1(a) to FIG. 6(c) and an operation thereof, and a second embodiment shown in FIG. 7(a) to FIG. 10(c) and an operation thereof, will be described in detail in that order.

First Embodiment

Figure 3A:
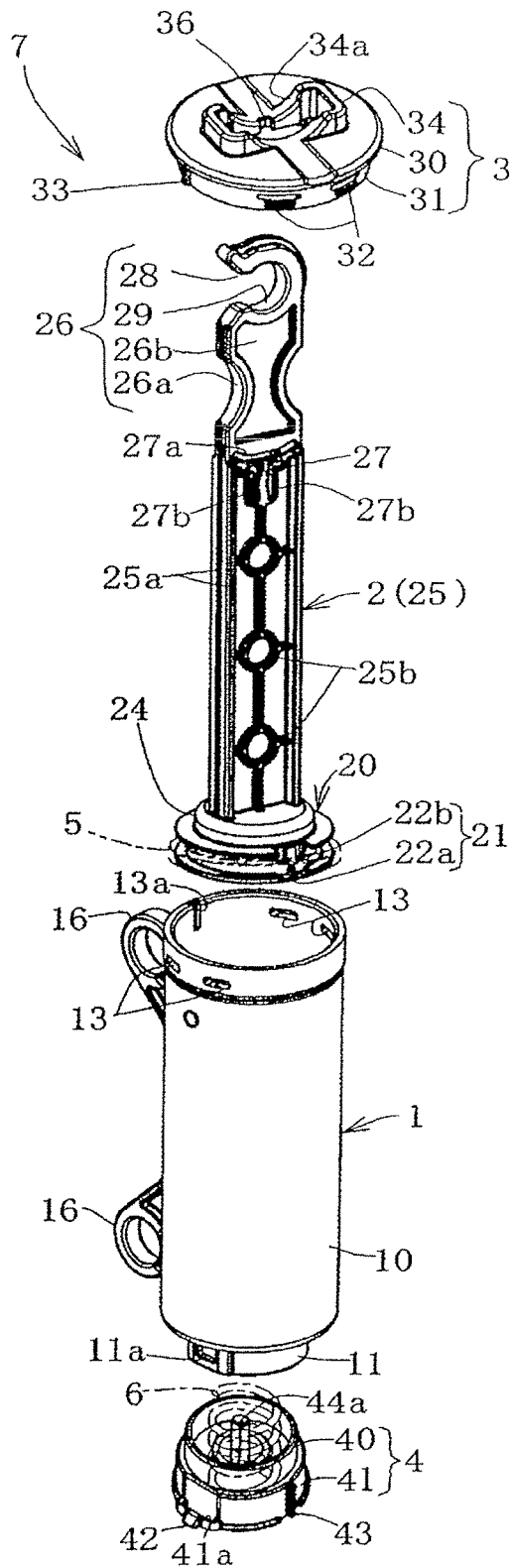
FIG. 3(a) is an exploded perspective view of the piston damper of the first embodiment.
Figure 3B:
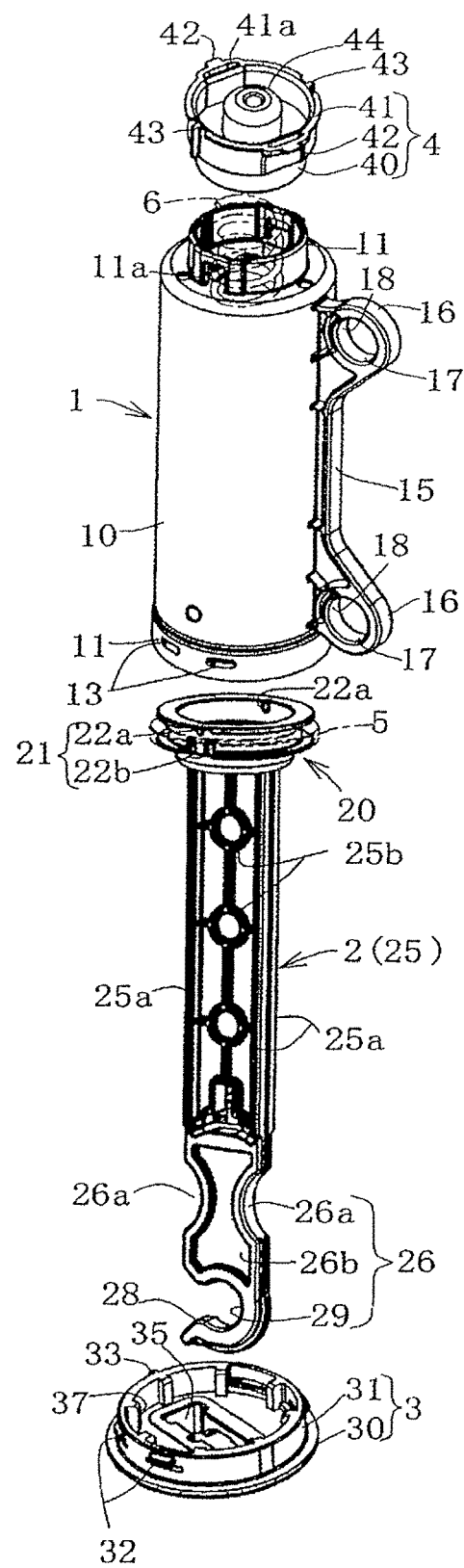
FIG. 3(b) is an exploded perspective view of the piston damper of the first embodiment which is shown by reversing the top and bottom of FIG. 3(a).

As shown in FIG. 3(a) and FIG. 3(b), a piston damper 7 is configured by a cylindrical cylinder 1; a piston 20 reciprocatingly disposed inside the cylinder 1; an O-ring 5 embedded in the piston 20; a rod 2 moved synchronously with the piston 20; a cap 3 attached to one end side of the cylinder 1; a valve 4 attached to the other end side of the cylinder 1; and a spring 6 intervened between the valve 4 and the other end of a cylinder 10. As for a material, the cylinder 10, the piston 20 and the rod 2, the cap 3, and the valve 4 are resin moldings. However, a material other than resin may be used.

Incidentally, among configuration members of the piston damper 7, at least for the cylinder 1, the rod 2, and the piston 20, there is used hard resin POM (poly acetal) which excels in an abrasion resistance property and a heat resistance property. The aforementioned configuration members are formed by a hard resin material, so that compared to a case of forming the configuration members by a soft resin material (for example, elastomer having a large elasticity at room temperature), a braking action thereof is difficult to become impaired even if the configuration members are used under an environment wherein, for example, an environmental temperature is 80° C. or above, or 0° C. or below.

Figure 6A:
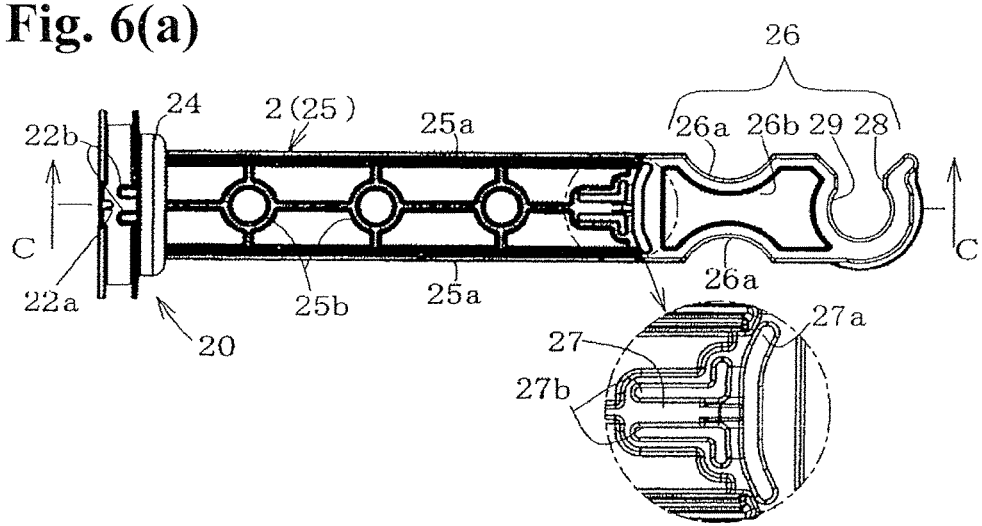
FIG. 6(a) is a side view of a rod single body of the piston damper of the first embodiment.
Figure 6B:
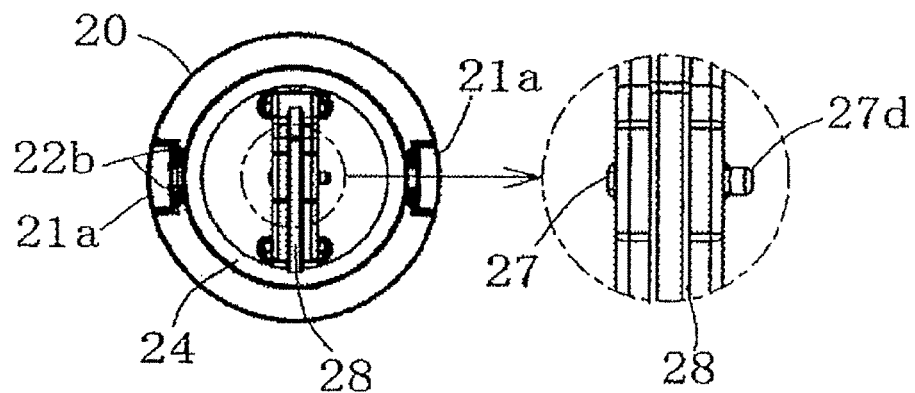
FIG. 6(b) is a right end view and a front view of the cap single body of the piston damper of the first embodiment.
Figure 6C:
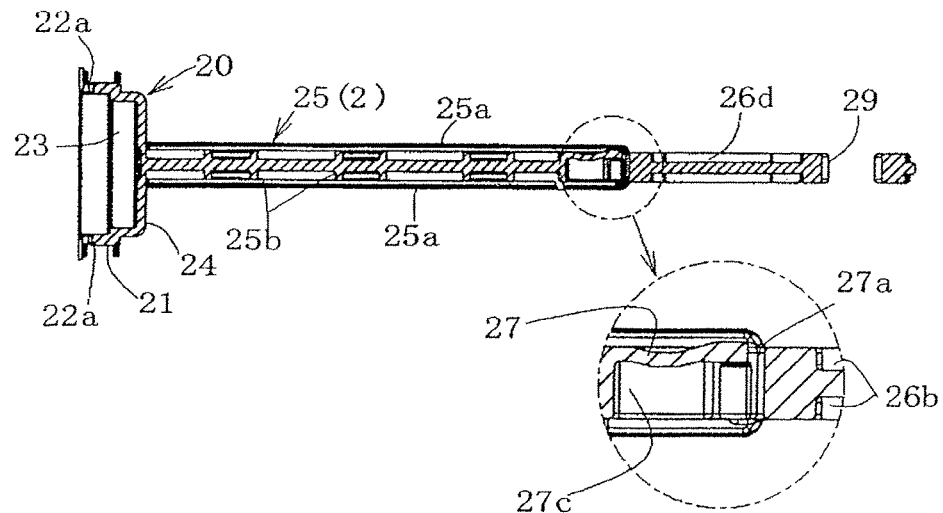
FIG. 6(c) is a cross-sectional view of the cap of the piston damper of the first embodiment taken along a line C-C shown in FIG. 5(a).
Figure 7A:
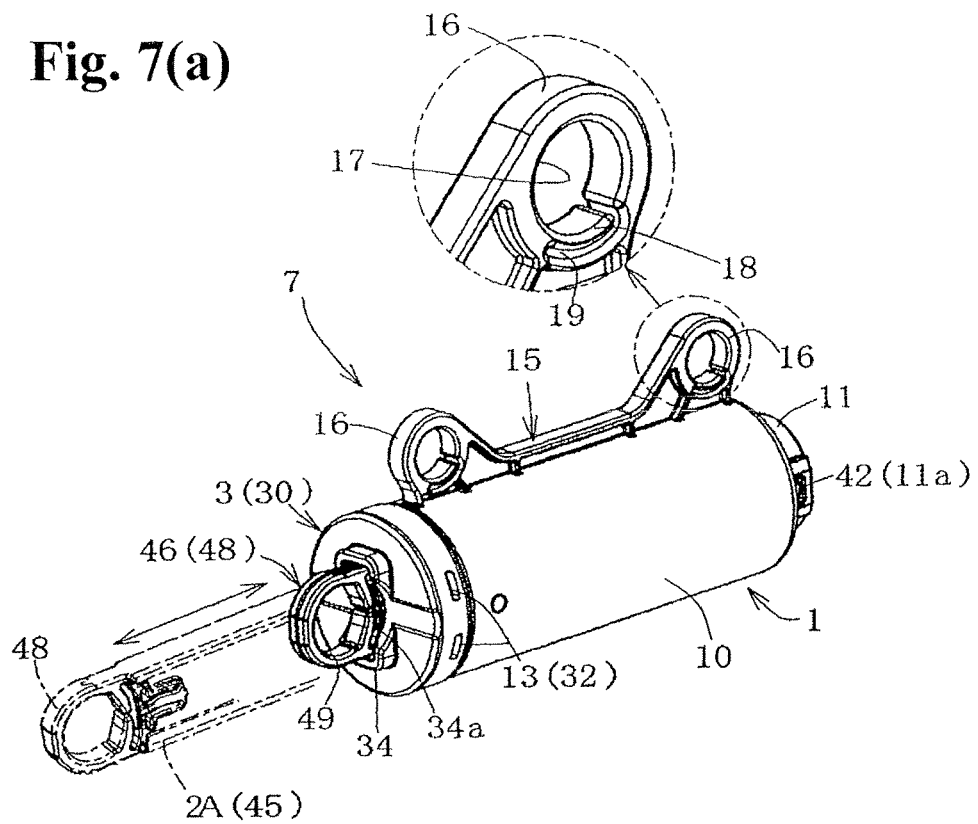
FIG. 7(a) is a schematic perspective view of the piston damper of a second embodiment viewed from the front in the entered state of the rod.
Figure 7B:
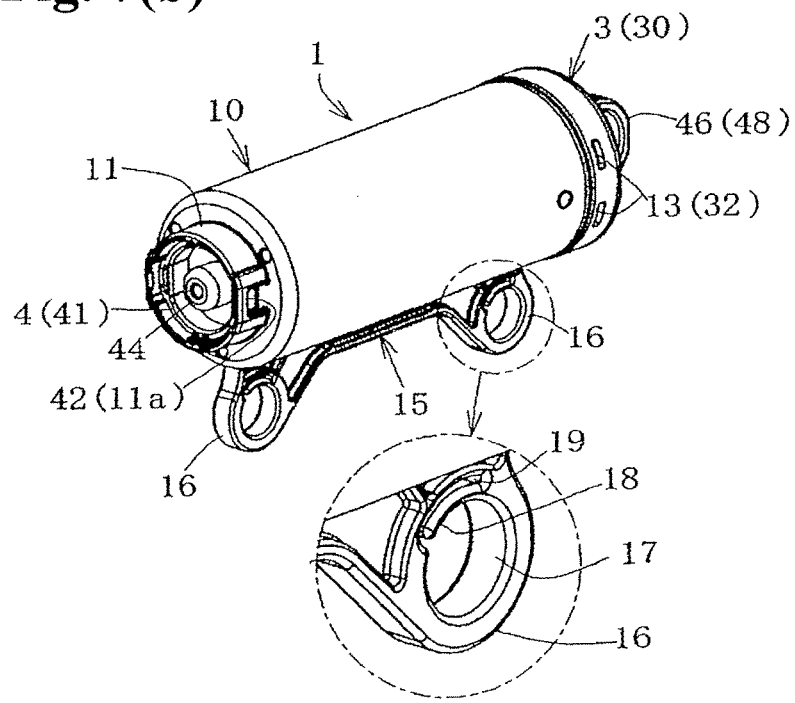
FIG. 7(b) is a schematic perspective view of the piston damper of the second embodiment viewed from the back in the entered state of the rod.

First, the rod 2 will be explained. As shown in FIG. 6(a) to FIG. 6(c), in the rod 2, the piston 20 is integrally formed in one end (a back end) of an arm portion 25, and an attachment portion 26 is integrally formed in the other end (a front end), respectively. The arm portion 25 is a portion protruding and entering with respect to the cylinder 1 in the rod 2. The arm portion 25 has a slender plate shape, and is reinforced by ribs 25a doubling as edging provided in each edge portion in a longitudinal direction of a plate, and ribs 25b provided between the ribs 25a on both sides. The attachment portion 26 is a portion disposed outside the cylinder 1, and comprises connecting portions 26a whose both sides are narrowed down to an arc-like shape near the arm portion 25; and a fitting hole 29 provided in an end. The fitting hole 29 is a clamp type with an opening 28 wherein one portion of the hole is notched. The reference numeral 26b is concave portions.

Within the arm portion 25, just in front of the attachment portion 26 (the connecting portions 26a), there is provided a fitting piece 27 on one lateral face, and there is provided a convex portion 27d on the other lateral face. The fitting piece 27 is a piece shape elongated in an axis portion direction, and can sway in a plate-thickness direction by a slit 27a provided on a front side and passing through both lateral faces; grooves 27b provided on both sides; and a notch portion 27c whose lower side is hollowed out.

The piston 20 is provided through a circular pedestal 24 in a terminal of the arm portion 25, and an inside is a hollow 23 together with the pedestal 24. Also, the piston 20 includes an encircling groove 21 formed on an outer circumference; and orifices (ventilation holes) 22a and 22b provided on a bottom face of the encircling groove 21 or on both sides of a groove width, and communicated with the hollow 23. In the encircling groove 21, there is disposed the O-ring 5 to be capable of swaying. As shown in an enlarged view in FIG. 2(c), in the encircling groove 21, among wall portions dividing a groove space, a wall portion on a pedestal 24 side is formed lower. The O-ring 5 slidingly contacts with an inner circumference of the cylinder 10 in a state of being disposed in the encircling groove 21, and divides the inside of the cylinder 10 into a front chamber on a cap 3 side and a back chamber on a holding portion 11 side.

Figure 4A:
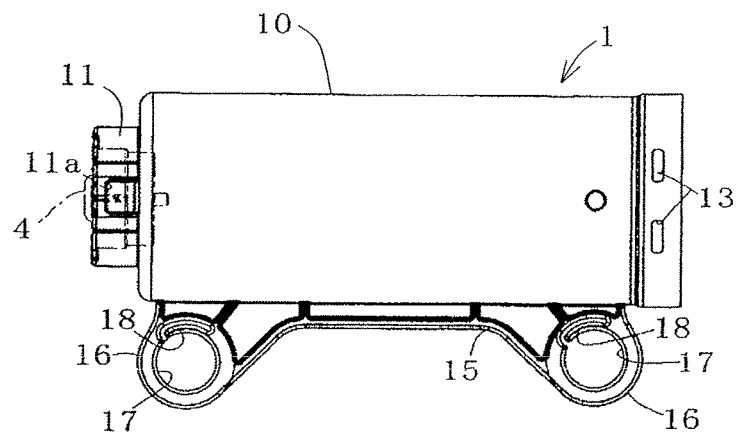
FIG. 4(a) is a side view of a cylinder single body of the piston damper of the first embodiment.
Figure 4B:
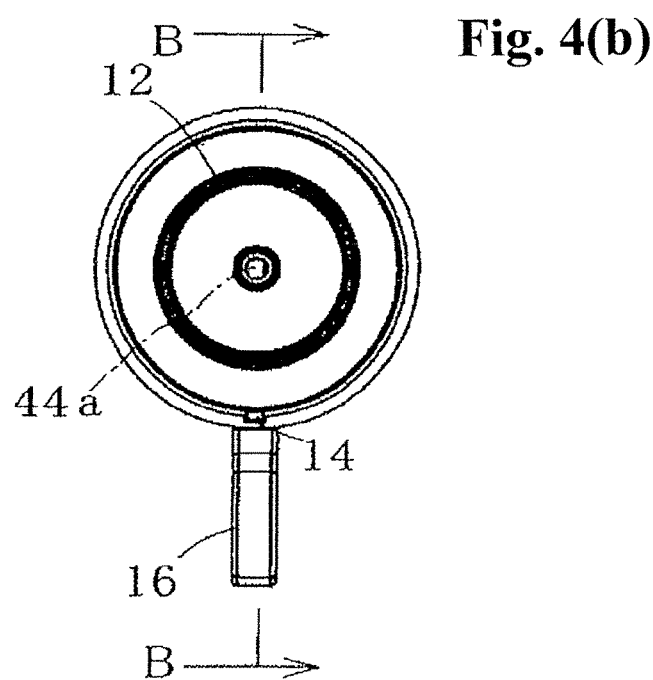
FIG. 4(b) is a right end view and a front view of the cylinder single body of the piston damper of the first embodiment.
Figure 4C:
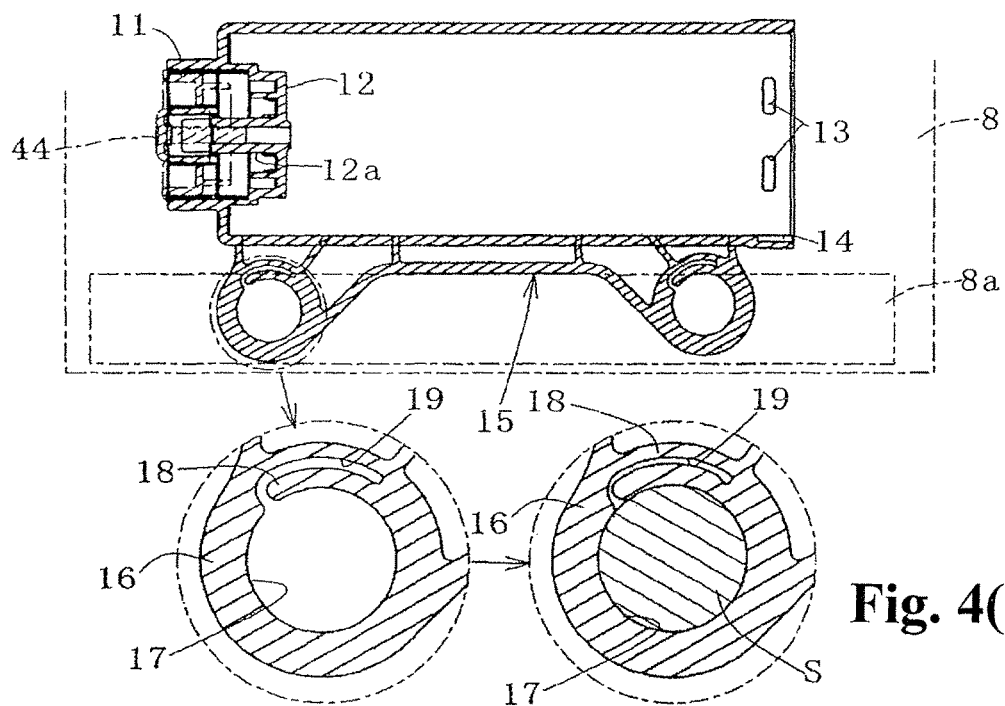
FIG. 4(c) is a cross-sectional view of the cylinder of the piston damper of the first embodiment taken along a line B-B shown in FIG. 4(b).

As shown in FIG. 4(a) to FIG. 4(c), the cylinder 1 includes a plate-like flange portion 15 provided to protrude on an outer circumferential wall of a cylinder body 10 and forming an attachment portion 16 on the front and back; a holding portion 11 provided on a back end side of the cylinder body 10 and supporting the valve 4 so as to be capable of swaying; a closure portion 12 located inside the cylinder 1, connected to a front end of the holding portion 11, and provided to project a pipe 12a for a gas adsorption exhaust in a central part; a plurality of locking holes 13 provided around a front end of the cylinder body 10 and locking the cap 3; and a positioning concave portion 14 provided in an inner face of the front end of the cylinder body 10.

Among those, as shown in FIG. 3(a) and FIG. 3(b), the holding portion 11 is a cylindrical body which is one size smaller than the cylinder body 10, and forms a plurality of holes 11a circumferentially passed through; and a plurality of guide grooves, which is not shown in the figures, located in an inner face of the cylinder, and extending in a front-back direction. The valve 4 is attached to be capable of swaying through the aforementioned holes 11a and the guide grooves. Namely, the valve 4 comprises a front cylinder portion 40 and a back cylinder portion 41, which nearly fit inside a cylinder shape of the holding portion 11. Also, the valve 4 includes a plurality of claws 42 provided to project around the back cylinder portion 41; transverse ribs 43 provided between the claws 42; and a protruding portion 44 located on an outer end face side, and provided to project in a central part of a concave shape. The claws 42 can elastically deform through a slit 41a on an inner side. The protruding portion 44 protrudes a support axis 44a in a hollow on the inner side.

The aforementioned valve 4 is assembled relative to the holding portion 11 in a state wherein the transverse ribs 43 are slidably fitted in the aforementioned guide grooves, and each claw 42 is loosely fitted in the corresponding hole 11a, with a state of supporting the coil-shaped spring 6 in the support axis 44a. Namely, the support axis 44a is loosely fitted inside the pipe 12a, and inside the holes 11a wherein the claws 42 are fitted in with a state of having looseness, the valve 4 is moved outermost by an urging force of the spring 6. Then, the valve 4 is associated with a forward-backward movement of the later-described piston 20 inside the cylinder 1, and can control an air amount absorbed and exhausted to the cylinder 1 which is carried out through the pipe 12a and a gap between the holding portion 11 and the valve 4.

Figure 5A:
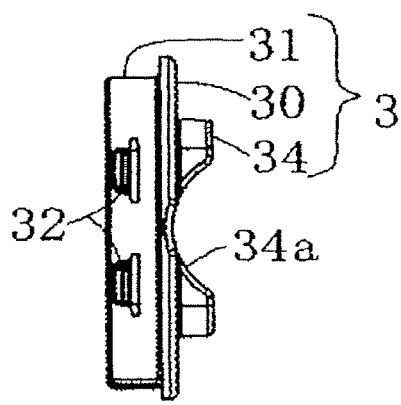
FIG. 5(a) is a side view of a cap single body of the piston damper of the first embodiment.
Figure 5B:
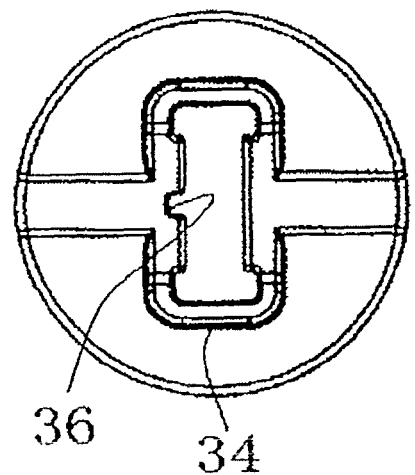
FIG. 5(b) is a right end view and a front view of the cap single body of the piston damper of the first embodiment.
Figure 5C:
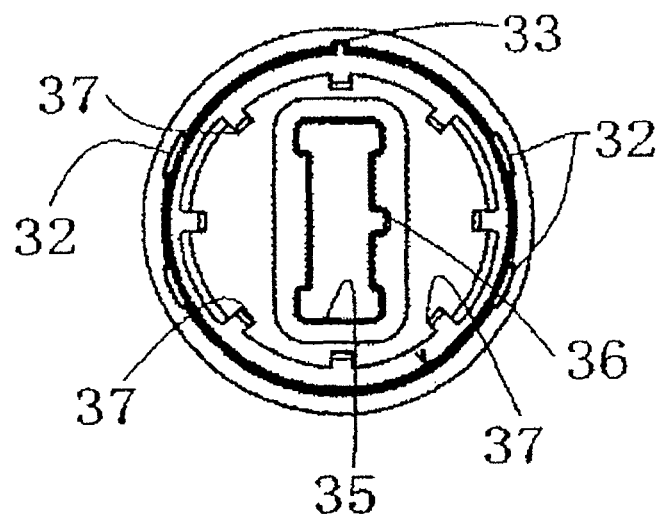
FIG. 5(c) is a back view of the cap single body of the piston damper of the first embodiment.

Also, as shown in FIGS. 5(a) to 5(c), the cap 3 comprises a flange portion 30 forming a through-hole 35 in a central part; a cylinder portion 31 provided to project on an inner face of the flange portion 30 and inserted into the cylinder 1; and a frame portion 34 provided to project on an outer face of the flange portion 30 and edging the through-hole 35. The through-hole 35 is a hole having an approximately rectangular shape movably inserting and passing the main body 25 of the rod 5. In the through-hole 35, there is provided a concave portion 36 on an inner face. The concave portion 36 fits into the convex portion 27d provided on a rod side in an entered state of the rod 2. Namely, in the structure, due to the fitting of the concave portion 36 and the convex portion 27d, for example, at a time of embedding the rod, the cylinder and the rod 2 can prevent a wrong assembly such as a direction (in this example, a direction of the opening 28) of the rod, and the like, and can easily control wobbling between members occurring between the cylinder 1 (the cap 3) and the rod 2. As for a shape, a convex portion may be provided in the through-hole 35, and may be fitted into a concave portion on the rod side. In the cylinder portion 31, there are provided a plurality of claws 32 and a positioning rib 33 on an outer circumference, and there is provided a plurality of reinforcement ribs 37 on an inner circumference. Each reinforcement rib 37 is a portion wherein the piston 20 abuts when the rod 2 protrudes the most from the cylinder 1, and the reinforcement rib 37 doubles as a stopper of the rod 2.

The frame portion 34 is divided in a rectangular shape by long sides and short sides. In a central part of each long side, there is formed a curve-shaped concave portion 34a. Those allow the rod 2 to maintain a stable sliding by reciprocating the main body 25 thereof through the frame portion 34 together with the through-hole 35. Also, the concave portion 34a can provide, for example, originality in a state wherein the rod 2 is entered to its fullest extent, or the concave portion 34a allows the aforementioned fitting piece 27 to easily escape at the curve-shaped concave portion.

The aforementioned cap 3 is placed relative to the cylinder 1 by an engagement between the claws 32 and the locking holes 13 in a state wherein the piston 20 and one portion of the main body 25 of the rod are disposed inside the cylinder 1. At that time, the cap 3 is positioned relative to the cylinder 1 by fitting the rib 33 into the concave portion 14. The convex portion 27d is disposed on the same side as the concave portion 36, so that the rod 2 prevents the wrong assembly relative to the cap 3.

On the other hand, in each attachment portion 16 of the cylinder, there is respectively formed a fitting hole 17, and includes an elastic piece portion 18 as an urging device. Each fitting hole 17 comprises a ring or a hole shape according to an axis. The elastic piece portion 18 is formed to be capable of deforming one portion dividing an inner circumferential face of the fitting hole 17 in a hole diameter direction through a slit 19. As shown in an enlarged view on a lower left of FIG. 4(c), the slit 19 is an arc shape having roughly the same curvature as an inner face of the fitting hole 17, and one end is communicated with the fitting hole 17. Consequently, the elastic piece portion 18 is in a cantilever state.

(Operation)

Next, main operational characteristics of the aforementioned piston damper 7 will be explained.

Figure 1A:
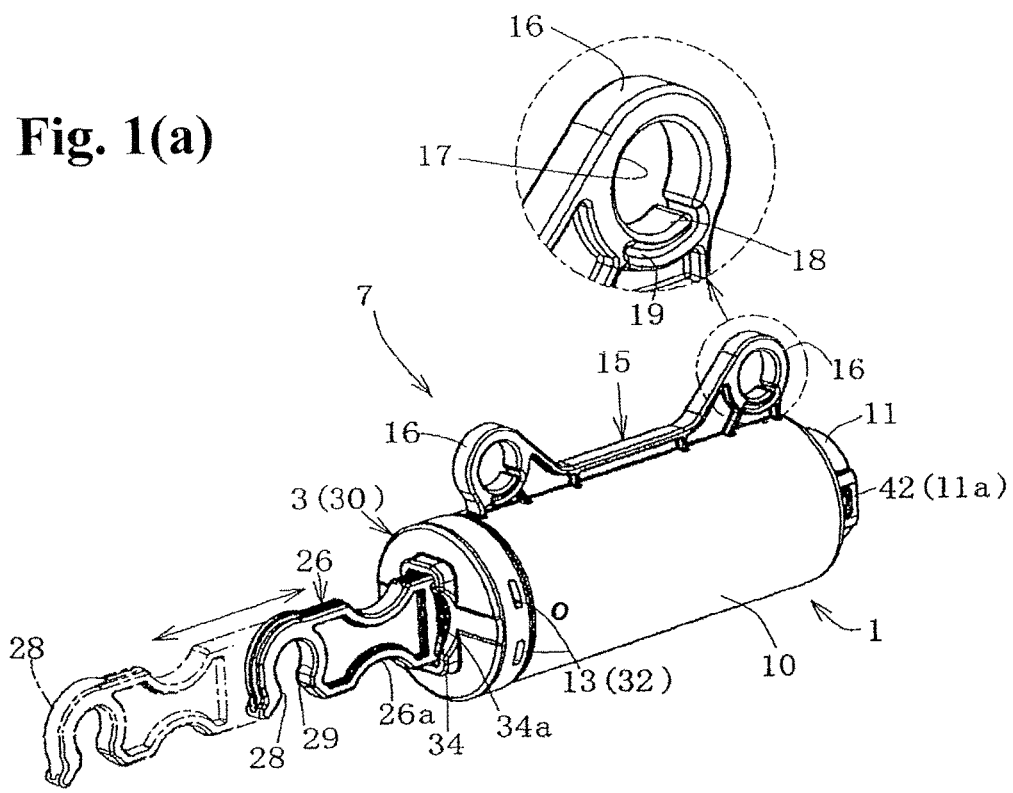
FIG. 1(a) is a schematic perspective view of a piston damper of the first embodiment which is viewed from the front in an entered state of a rod.
Figure 1B:
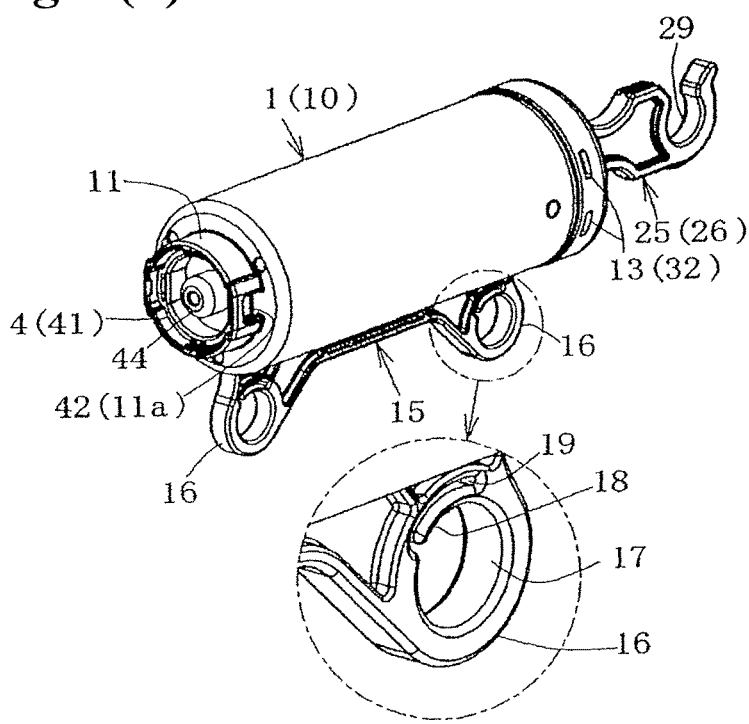
FIG. 1(b) is a schematic perspective view of the piston damper of the first embodiment which is viewed from the back in the entered state of the rod.
Figure 2A:
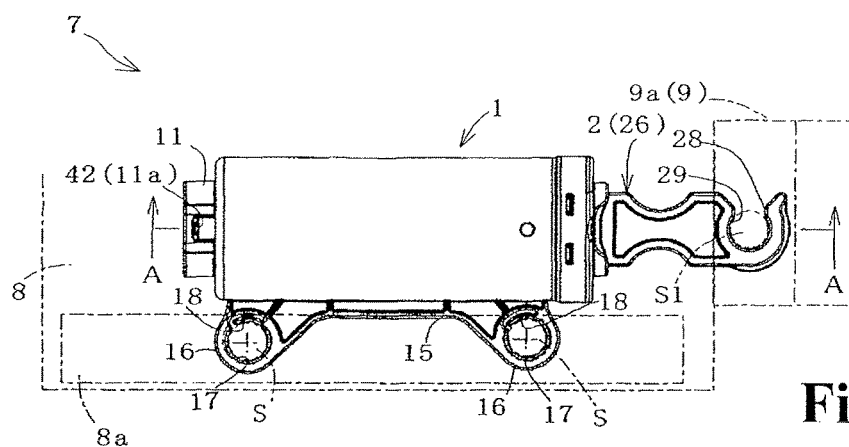
FIG. 2(a) is a side view of the piston damper of the first embodiment.

(1) For example, as shown in FIG. 2(a) and FIG. 4(c) schematically, the piston damper 7 of the first embodiment is disposed between a first member 8 and a second member 9, and brakes a movement speed of the second member 9 on a movable side. There, the cylinder 1 is attached relative to a disposed portion 8a of the first member 8, and the rod 2 is attached relative to a disposed portion 9a of the second member 9. Among those, the rod 2 is pivotally supported turnably by the fitting between the fitting hole 29 and a boss, or an axis or shaft S1 of a bolt, a screw, and the like in a similar manner as a conventional one; or the rod 2 is non-turnably fixed. On the other hand, the cylinder 1 is axially supported by the fitting between the fitting hole 17 and the boss, or an axis or shaft S of the screw, the bolt, and the like. In that case, among enlarged views in FIG. 4(c), as shown in the enlarged view on a right side, the shaft S is pressed into the fitting hole 17. However, the axis S is strongly pressed into the fitting hole 17 until the elastic piece portion 18 deforms to a slit 19 side. Consequently, in the structure, the elastic piece portion 18 reliably maintains a tight fit to the shaft S in the fitting hole 17, so that even if the fitting between the axis S and the fitting hole 17 somewhat has loosened due to, for example, an abrasion of the piston damper 7 by being used for long periods, or a heat deformation of the piston damper 7 by being subjected to a high-temperature environment, the abrasion and the heat deformation can be absorbed by an urging force of the elastic piece portion 18. As a result, compared to a conventional structure, by a simple configuration, the occurrence of the wobbling in the attachment portion 16 is prevented so as to be capable of maintaining an excellent braking action.

Figure 2B:
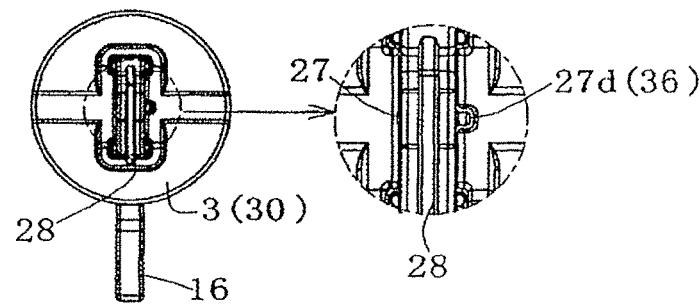
FIG. 2(b) is a right end view and a front view of the piston damper of the first embodiment.
Figure 2C:
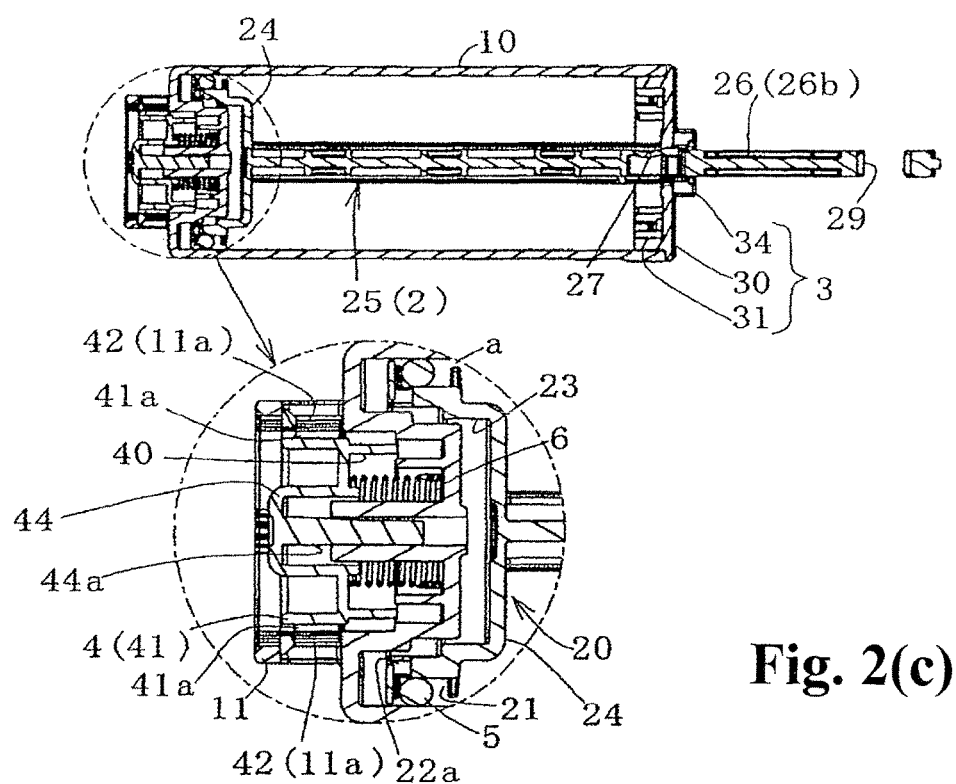
FIG. 2(c) is a cross-sectional view of the piston damper of the first embodiment taken along a line A-A shown in FIG. 2(a).

(2) In a process wherein the rod 2 (the piston 20) moves in a direction protruding from the cylinder 1, the O-ring 5 moves so as to block a passage formed between the orifice 22a and the aforementioned front chamber inside the groove width of the encircling groove 21 as in the enlarged view in FIG. 2(c), and the air in the front chamber acts so as to flow to the back chamber from a gap a set between a front wall (a wall on a right side of the aforementioned enlarged view) dividing the encircling groove 21 and the inner face of the cylinder. As a result, the aforementioned piston damper 7 applies brake on the rod 2 as a braking force so as to allow the rod 2 to slowly protrude. In an opposite manner, in a process wherein the rod (the piston 20) moves in a direction entering into the cylinder 1, the O-ring 5 moves to a front wall side (so as to block the gap a) mentioned above inside the groove width of the encircling groove 21, and the air in the back chamber acts so as to flow to the front chamber from the valve 4, the orifice 22*a*, and the orifice 22*b*. As a result, the rod 2 is moved to be entered without putting a brake on the rod 2. Incidentally, in the aforementioned structure, it is designed so that especially, a negative pressure becomes constant as much as possible (for details, see Japanese Patent Application Publication No. 2010-1920).

(3) As a specific example, in a usage example wherein the second member 9 in FIG. 2(*a*) is switched between an open or separated position which is separated from the first member 8, and a closed or abutted position which is close to the first member 8, in a process wherein the second member 9 is switched from the abutted position to the separated position, the second member 9 receives the braking force of the piston damper 7 so as to be slowly moved. However, in a process wherein the second member 9 is switched from the separated position to the abutted position, the second member 9 does not receive the braking force of the piston damper 7. In the aforementioned basic operation, in the structure, first, the rod 2 is guided by the through-hole 35 and the frame portion 34 of the cap, so that there are advantages of carrying out a reciprocating movement of the rod in a more stable state; preventing an amount of expansion and contraction of the rod 2 from being impaired by allowing the fitting piece 27 to escape at the curve-shaped concave portion 34*a*; excelling in a design property in a state wherein the rod 2 is completely entered with respect to the cylinder 1; and the like.

(4) In addition, in the structure, just before a final push of the rod 2 is carried out relative to the cylinder 1, and in the aforementioned usage example, when the second member 9 reaches the closed or abutted position which is close to the first member, the fitting piece 27 of the rod presses against the inner face dividing the through-hole 35 of the cap. At the same time, at the time of embedding the rod 2 relative to the cylinder 1, by the fitting of the concave portion 36 and the convex portion 27*d*, the through-hole 35 of the cap and the rod 2 can reliably prevent the wrong assembly such as the direction (in this example, the direction of the opening 28) of the rod 2, and the like. Also, there is an effect of controlling the wobbling between the members occurring between the cylinder 1 (the cap 3) and the rod 2. Consequently, in the structure, there are advantages of eliminating a possibility of the wrong assembly; being capable of easing a load of each portion caused by especially a push of the rod 2 in an entered direction at least in the entered state of the rod 2 relative to the cylinder 1; being capable of preventing an excessive push of the rod 2; and the like.

Second Embodiment

Figure 8A:
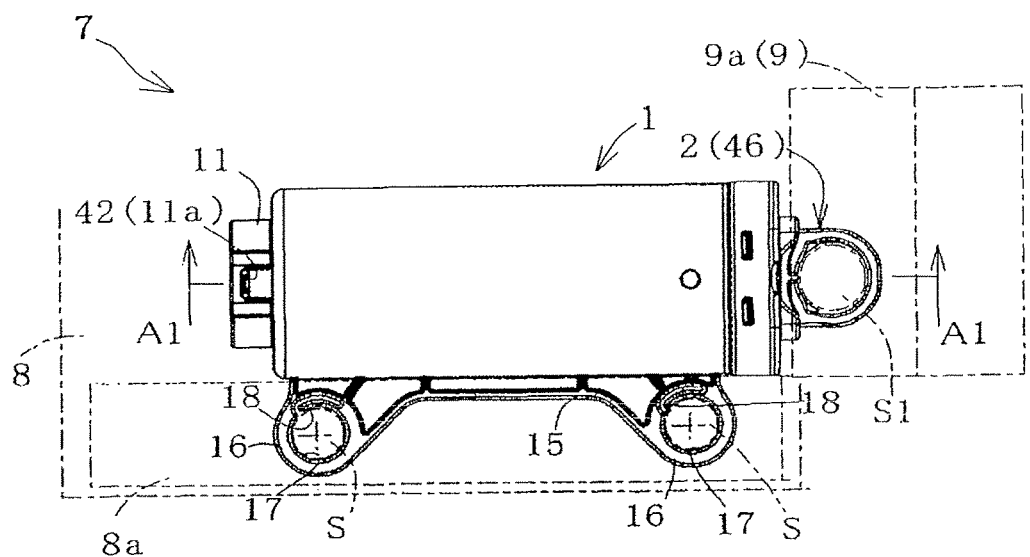
FIG. 8(a) is a side view of the piston damper of the second embodiment.
Figure 8B:
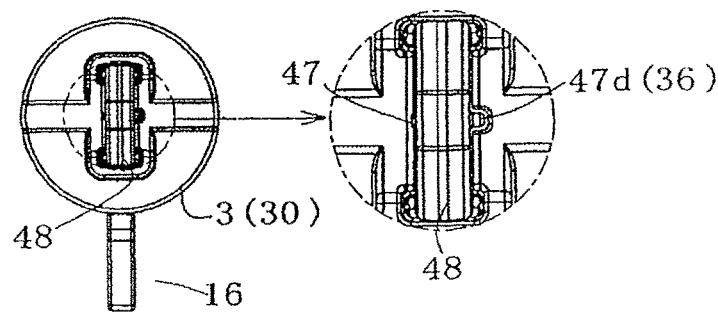
FIG. 8(b) is a right end view and a front view of the piston damper of the second embodiment.
Figure 8C:
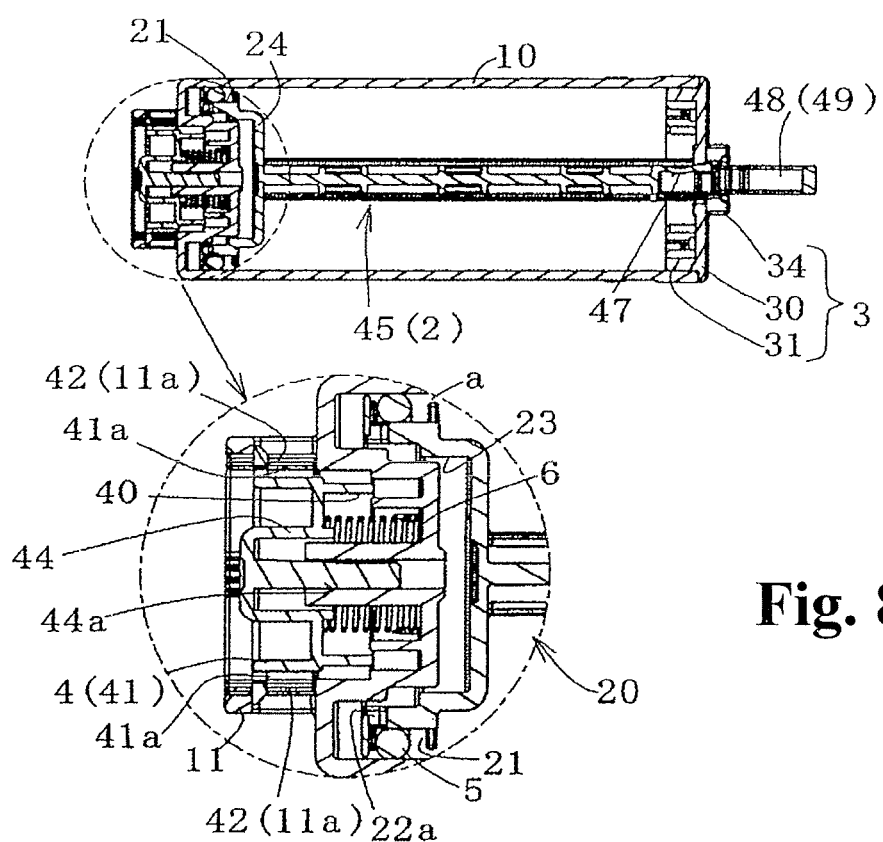
FIG. 8(c) is a cross-sectional view of the piston damper of the second embodiment taken along a line A1-A1 shown in FIG. 8(a).
Figure 9A:
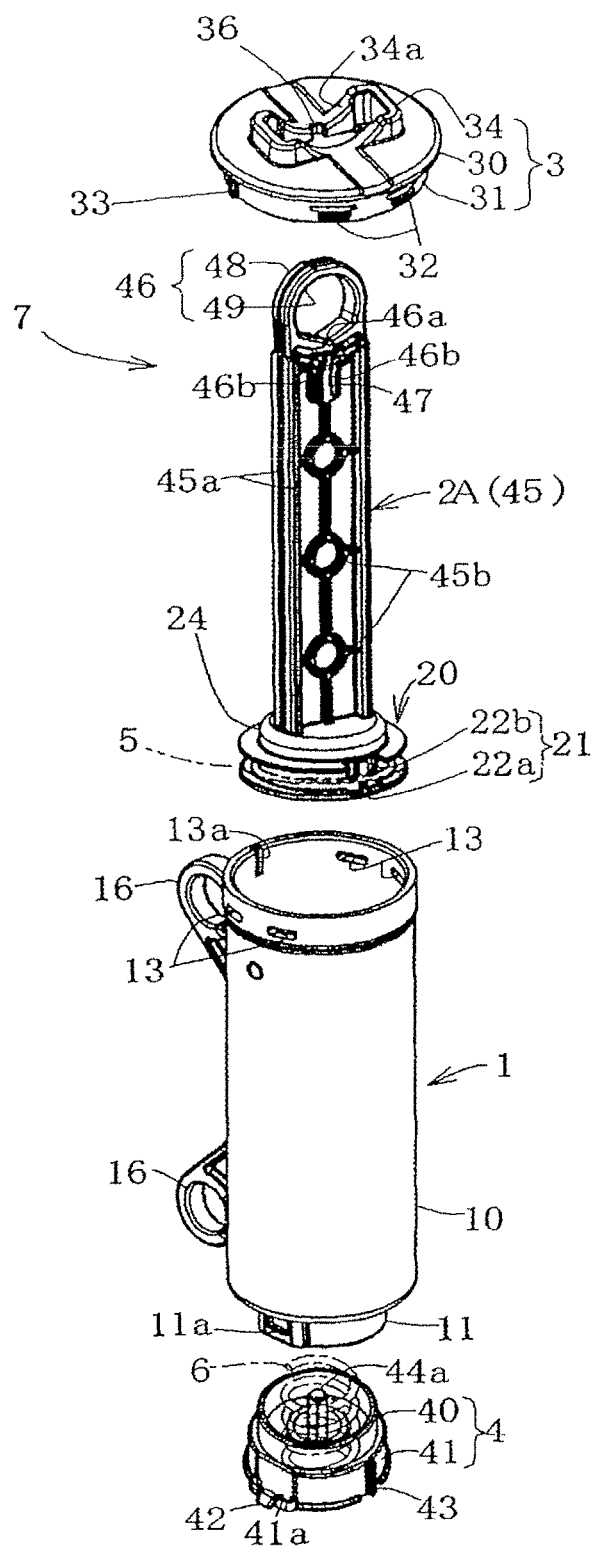
FIG. 9(a) is an exploded perspective view of the piston damper of the second embodiment.
Figure 9B:
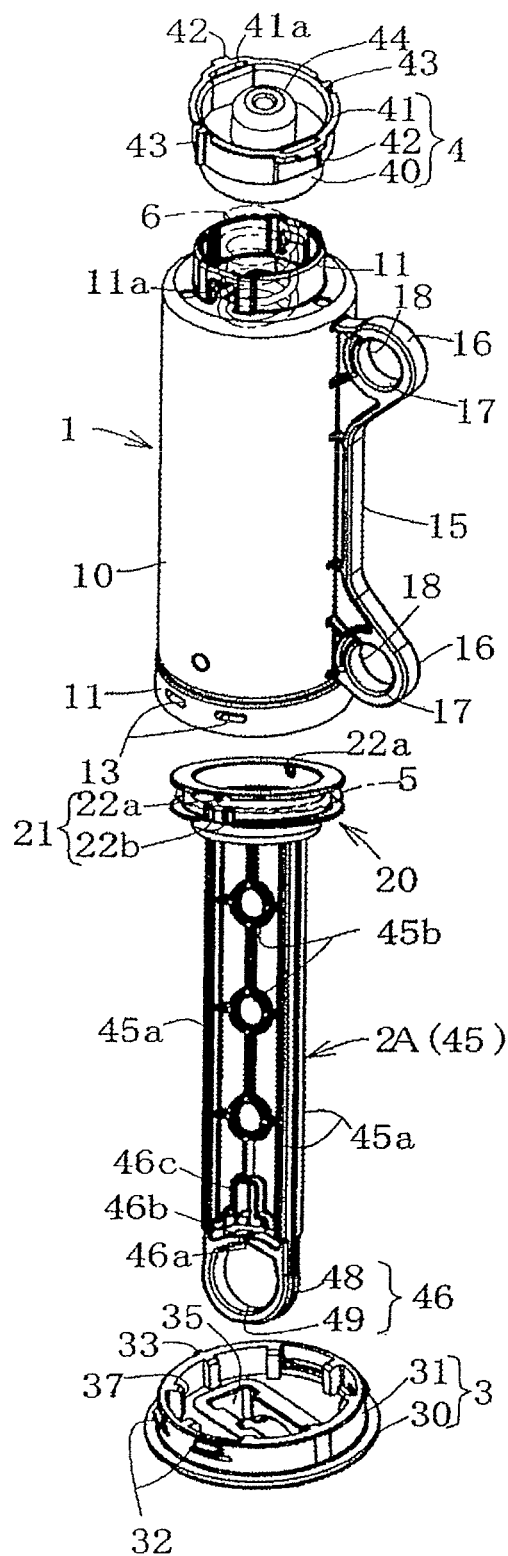
FIG. 9(b) is an exploded perspective view of the piston damper of the second-embodiment which is shown by reversing the top and bottom of FIG. 9(a).

The piston damper 7 of the second embodiment shown in FIG. 5(*a*) to FIG. 8(*c*) comprises a rod 2A in place of the rod 2 provided in the piston damper 7 of the first embodiment. Therefore, in the following explanation, the same symbols are assigned to the same or corresponding parts of the piston damper 7 of the first embodiment, and the piston damper 7 of the second embodiment will be described by focusing on a modified configuration as much as possible.

Figure 10A:
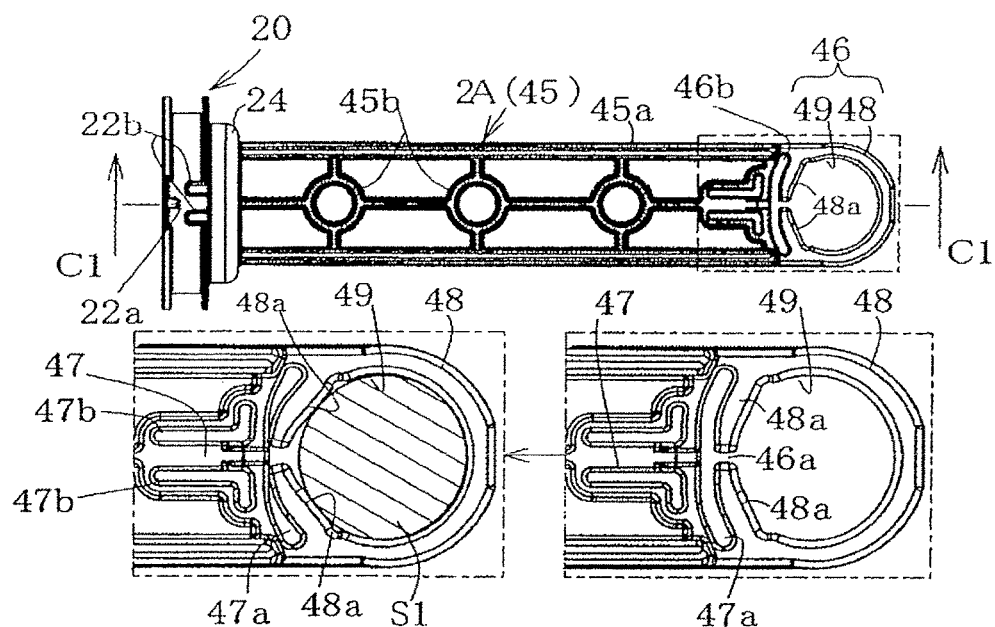
FIG. 10(a) is a side view of the rod single body of the piston damper of the second embodiment.
Figure 10B:
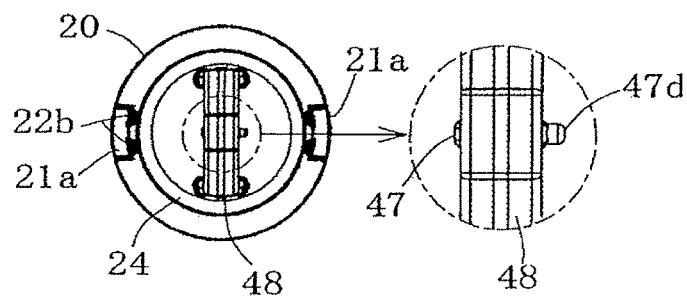
FIG. 10(b) is a right end view and a front view of the rod single body of the piston damper of the second embodiment.
Figure 10C:
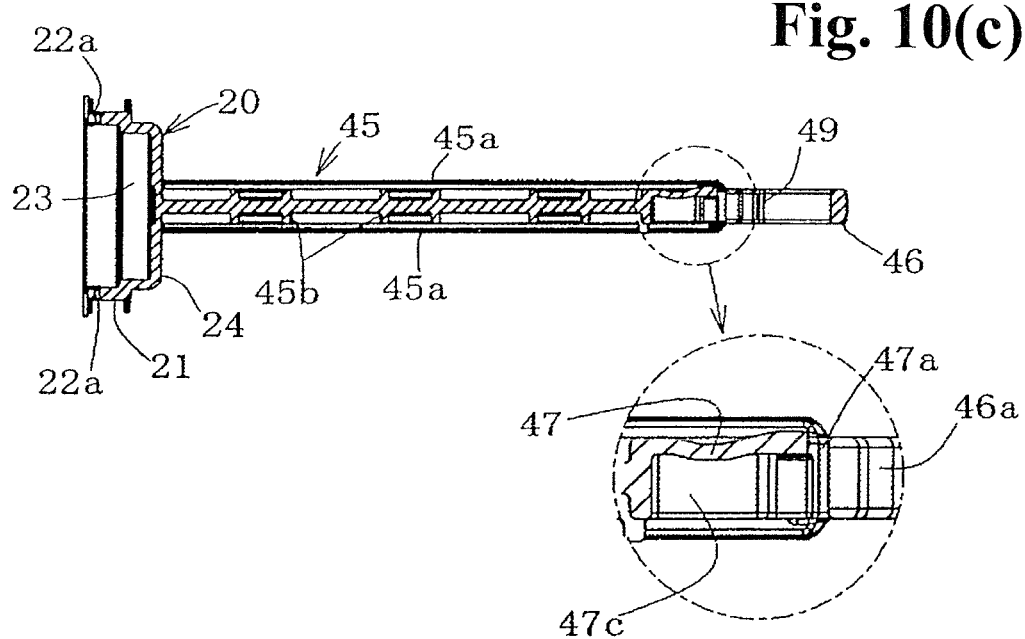
FIG. 10(c) is a cross-sectional view of the rod of the piston damper of the second embodiment taken along a line C1-C1 in FIG. 10(a).
Figure 11A:
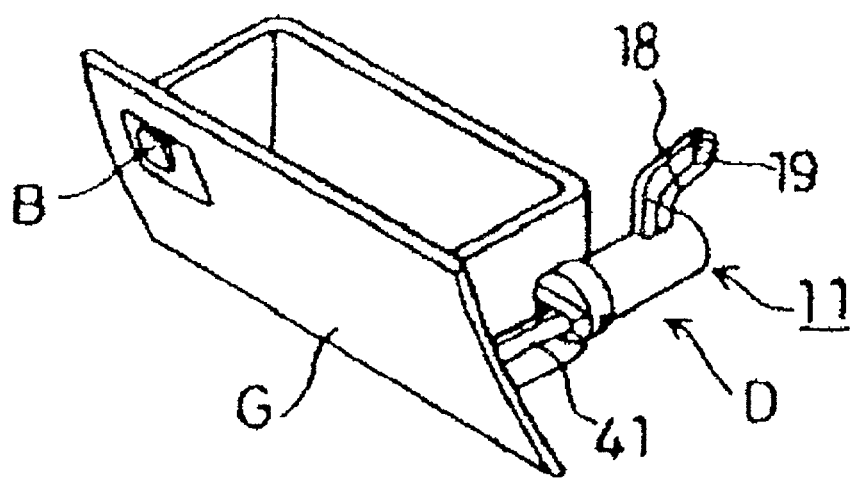
FIG. 11(a) shows a usage example of the piston damper (an air damper) disclosed in Patent Document 1.
Figure 11B:
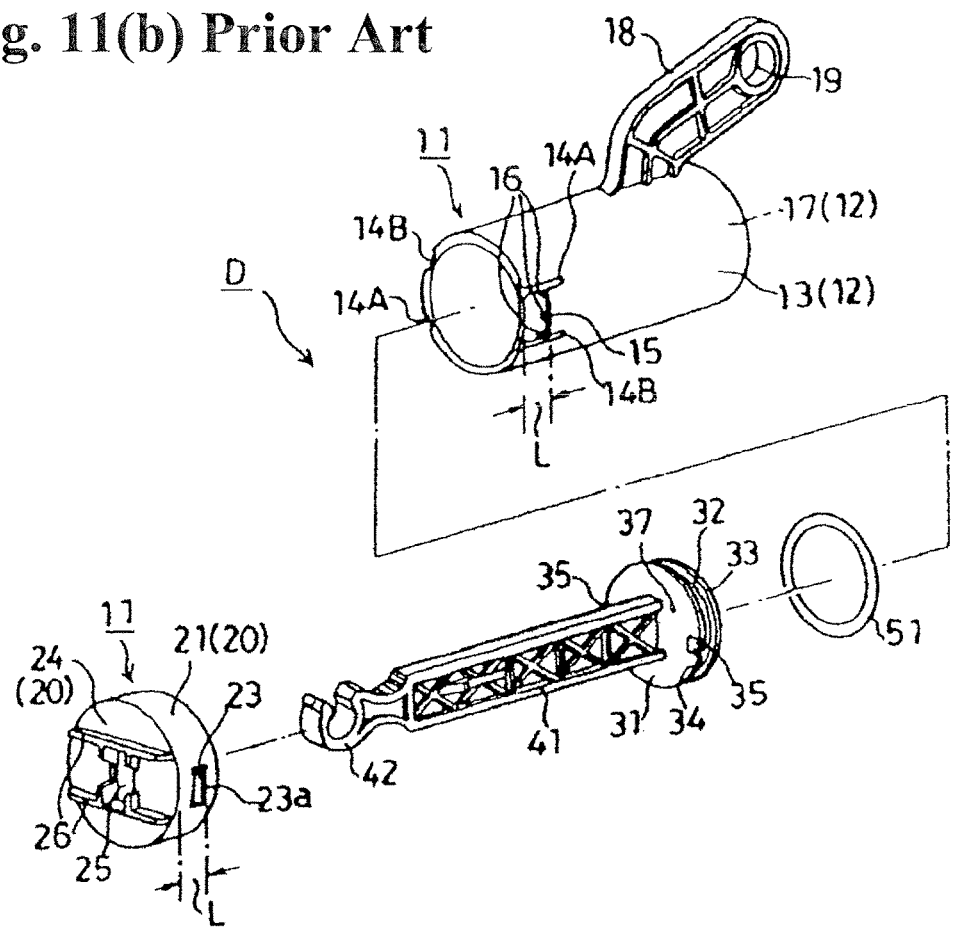
FIG. 11(b) shows a structure of the piston damper (the air damper) disclosed in the Patent Document 1.

As shown in FIG. 10(*a*) to FIG. 10(*c*), in the rod 2A of the second embodiment, the piston 20 is integrally formed in one end (a back end) of an arm portion 45, and an attachment portion 46 is integrally formed in the other end (a front end), respectively. The arm portion 45 is a portion protruding and entering with respect to the cylinder 1, and is reinforced by ribs 45*a* doubling as edging provided in each edge portion in a longitudinal direction of a slender plate, and ribs 45*b* provided between the ribs 45*a* on both sides. The attachment portion 46 is a portion disposed outside the cylinder 1. Those are the same as the first embodiment. However, the attachment portion 46 includes a fitting hole 49 and a pair of elastic piece portions 48*a* as the urging device.

Namely, in the fitting hole 49, one portion of the hole is not notched in the same way that the first embodiment is. The fitting hole 49 is a hole divided by a ring portion 48 with a ring or a through-hole shape having a size corresponding to the axis S1, i.e., a hold type. As shown in an enlarged view on a lower right of FIG. 10(*a*), in each elastic piece portion 48*a*, one portion dividing an inner circumferential face of the fitting hole 49 is formed in a cantilever state through a slit 47*a* and a slit 46*a* provided between the elastic piece portions. Also, each elastic piece portion 48*a* is deformably formed in a hole diameter direction. The slit 47*a* and the slit 46*a* pass through both lateral faces. Also, each elastic piece portion 48*a* or the slit 47*a* has an arc shape having roughly the same curvature as the inner face of the fitting hole 17.

Within the arm portion 45, just in front of the attachment portion 46, there is provided a fitting piece 47 on one lateral face, and there is provided a convex portion 47*d* on the other lateral face. The fitting piece 47 is a piece shape elongated in an axis direction, and can sway in a plate-thickness direction by the aforementioned slit 27*a*; grooves 47*b* provided on both sides; and a notch portion 47*c* whose lower side is hollowed out.

(Operation)

In the piston damper 7 of the second embodiment having the aforementioned structure, among the aforementioned operational characteristics (1) to (4) of the piston damper 7 of the first embodiment, (1), (3), and (4) are modified as follows.

(1) For example, as shown in FIG. 8(*a*) and FIG. 10(*a*) schematically, the piston damper 7 of the second embodiment is disposed between the first member 8 and the second member 9, and applies a brake on the movement speed of the second member 9 on the movable side. There, the cylinder 1 is attached relative to the disposed portion 8*a* of the first member 8, and the rod 2 is attached relative to the disposed portion 9*a* of the second member 9. Among those, as in a similar manner as the first embodiment, the cylinder 1 is axially supported, or non-turnably fixed, or as necessary, the cylinder 1 is pivotally supported turnably. On the other hand, the rod 2A is axially supported by the fitting between the fitting hole 49 and the boss, or the axis S1 of the screw, the bolt, and the like, or the rod 2A is non-turnably fixed. In that case, among enlarged views in FIG. 10(*a*), as shown in the enlarged view on a left side, the axis S1 is pressed into the fitting hole 49. However, the axis S1 is strongly pressed into the fitting hole 49 until each elastic piece portion 48*a* deforms to a slit 47*a* side. Consequently, in the structure, each elastic piece portion 48*a* reliably absorbs looseness of the fitting hole 49 relative to the axis S1, so that even if the fitting between the axis S1 and the fitting hole 49 somewhat has loosened due to, for example, an abrasion of the piston damper 7A by being used for long periods, or a heat deformation of the piston damper 7A by being subjected to a high-temperature environment, the abrasion and the heat deformation can be absorbed by an urging force of each elastic piece portion 48*a*. As a result, compared to the conventional structure, by the simple configuration, the occurrence of the wobbling in the attachment portion 46 together with the attachment portion 16 is prevented so as to be capable of maintaining the excellent braking action.

(3) As a specific example, in a usage example wherein the second member 9 in FIG. 8(*a*) is switched between an open or separated position which is separated from the first member 8, and a closed or abutted position which is close to the first member 8, in a process wherein the second member 9 is switched from the abutted position to the separated position, the second member 9 receives the braking force of the piston damper so as to be slowly moved. However, in a process wherein the second member 9 is switched from the separated position to the abutted position, the second member 9 does not receive the braking force of the piston damper 7. In the aforementioned basic operation, in the structure, first, the rod 2A is guided by the through-hole 35 and the frame portion 34 of the cap, so that there are advantages of carrying out the reciprocating movement of the rod in the more stable state; maintaining a deformation of each elastic piece portion 48a at the curve-shaped concave portion 34a in a pushed state of the rod 2A relative to the cylinder 1; preventing the amount of expansion and contraction of the rod 2 from being impaired by allowing the fitting piece 47 to escape at the curve-shaped concave portion 34a; excelling in the design property in a state wherein the rod 2A is completely entered with respect to the cylinder 1; and the like.

(4) In addition, in the structure, just before the rod 2A is completely pushed in relative to the cylinder 1, i.e., in the aforementioned usage example, when the second member 9 reaches the closed or abutted position which is close to the first member 8, the fitting piece 47 of the rod presses against the inner face dividing the through-hole 35 of the cap. At the same time, in the structure, there are advantages of being capable of absorbing the wobbling between the members which can easily occur between the cylinder 1 (or the cap 3) and the rod 2A (or the main body 45 thereof) at least in the entered state of the rod 2A relative to the cylinder 1 by a pressed-contacting action of the fitting piece 47 thereof, and/or the fitting between the concave portion 36 and the convex portion 47d; being capable of easing a load of each portion caused by a push of the rod 2A in the entered direction; being capable of preventing the excessive push of the rod 2A; and the like.

Incidentally, the present invention is not limited to the aforementioned respective embodiments provided that technical elements specified in the scope of claims, and details can be variously modified or expanded.

The present application is based on Japanese Patent Application No. 2010-239187 filed on Oct. 26, 2010, and all contents thereof are incorporated herein as a reference.

EXPLANATION OF SYMBOLS

1 . . . a cylinder
10 . . . a cylinder body
11 . . . a holding portion
11a . . . holes
12 . . . a closure portion
12a . . . a pipe
13 . . . locking holes
14 . . . a positioning concave portion
15 . . . a flange portion
16 . . . an attachment portion
17 . . . a fitting hole
18 . . . an elastic piece portion
19 . . . a slit
2 . . . a rod
2A . . . a rod
20 . . . a piston
21 . . . an encircling groove
22a and 22b . . . orifices
23 . . . a hollow
24 . . . a pedestal
25 . . . an arm portion
25a and 25b . . . ribs
26 . . . an attachment portion
26a . . . connecting portions
27 . . . a fitting piece
28 . . . an opening
29 . . . a fitting hole
3 . . . a cap
30 . . . a flange portion
31 . . . a cylinder portion
32 . . . claws
33 . . . a positioning rib
34 . . . a frame portion
34a . . . a curve-shaped concave portion
35 . . . a through-hole
36 . . . a concave portion doubling as positioning
37 . . . reinforcement ribs
4 . . . a valve
40 . . . a front cylinder portion
41 . . . a back cylinder portion
41a . . . a slit
42 . . . claws
43 . . . transverse ribs
44 . . . a protruding portion
44a . . . a support axis
45 . . . an arm portion
46 . . . an attachment portion
46a . . . a slit
47 . . . a fitting piece
47a . . . a slit
47b . . . grooves
47c . . . a notch portion
47d . . . a convex portion
48a . . . elastic piece portions
49 . . . a fitting hole
5 . . . an O-ring
6 . . . a spring
7 . . . a piston damper
8 . . . a first member
8a . . . an attachment portion
9 . . . a second member
9a . . . an attachment portion

What is claimed is:
1. A combination comprising:
a piston damper, comprising:
  a cylinder including an attachment portion;
  a piston reciprocatingly disposed inside the cylinder; and
  a rod including an attachment portion that is moved synchronously with the piston,
  wherein the attachment portion of the cylinder is adapted to connect to a first member, and
  the attachment portion of the rod is adapted to connect to a second member to damp a movement of the first member relative to the second member, and
a shaft portion adapted to be attached to the first member and connected to the attachment portion of the cylinder,
wherein the attachment portion of the cylinder is formed with a fitting hole to receive the shaft portion, a slit extending from the fitting hole and partially surrounding a circumference of the fitting hole, and a single elastic piece portion disposed between the slit and the fitting hole to press fit the shaft portion,
the elastic piece portion deforms in a radial direction of the fitting hole toward the slit when the shaft portion is inserted into the fitting hole, and after the shaft portion is attached to the fitting hole, the attachment portion is axially supported to the first member in a fitted state in which the elastic piece portion urges the shaft portion to be press fitted in the fitting hole in the radial direction of the fitting hole for absorbing looseness of the fitting hole relative to the shaft portion, the elastic piece portion partially surrounding the circumference of the fitting hole forms one portion of a circumferential surface of the fitting hole, and the slit has an arc shape substantially similar to one portion of the inner circumferential surface of the fitting hole.

2. A combination according to claim 1, further comprising:

another shaft portion adapted to be attached to the second member, and connected to the attachment portion of the rod, wherein the attachment portion of the rod includes a free end portion having a rigid body, another fitting hole to receive the another shaft portion, another slit extending in a circumferential direction of said another fitting hole and arranged only on a cylinder side opposite to a side of the free end portion in respect to said another fitting hole, the another slit communicating with the another fitting hole in a center of the another slit, and two elastic piece portions disposed between said another slit and said another fitting hole to press fit said another shaft portion so that a force applied to the rod in a direction away from the cylinder is applied to the rigid body.

3. A combination according to claim 1, wherein the attachment portion of the cylinder includes a first side portion connected to an outer circumferential wall of the cylinder, and a second side portion opposite to the first side portion in respect to the fitting hole and having a rigid body, and the slit is arranged between the first side portion and the fitting hole so that a force applied to the shaft portion in a direction away from the cylinder is applied to the rigid body.

* * * * *